June 19, 1923.  1,459,527
H. J. FERRIS
WHEEL FOR COASTER WAGONS
Filed Oct. 16, 1922   2 Sheets-Sheet 1
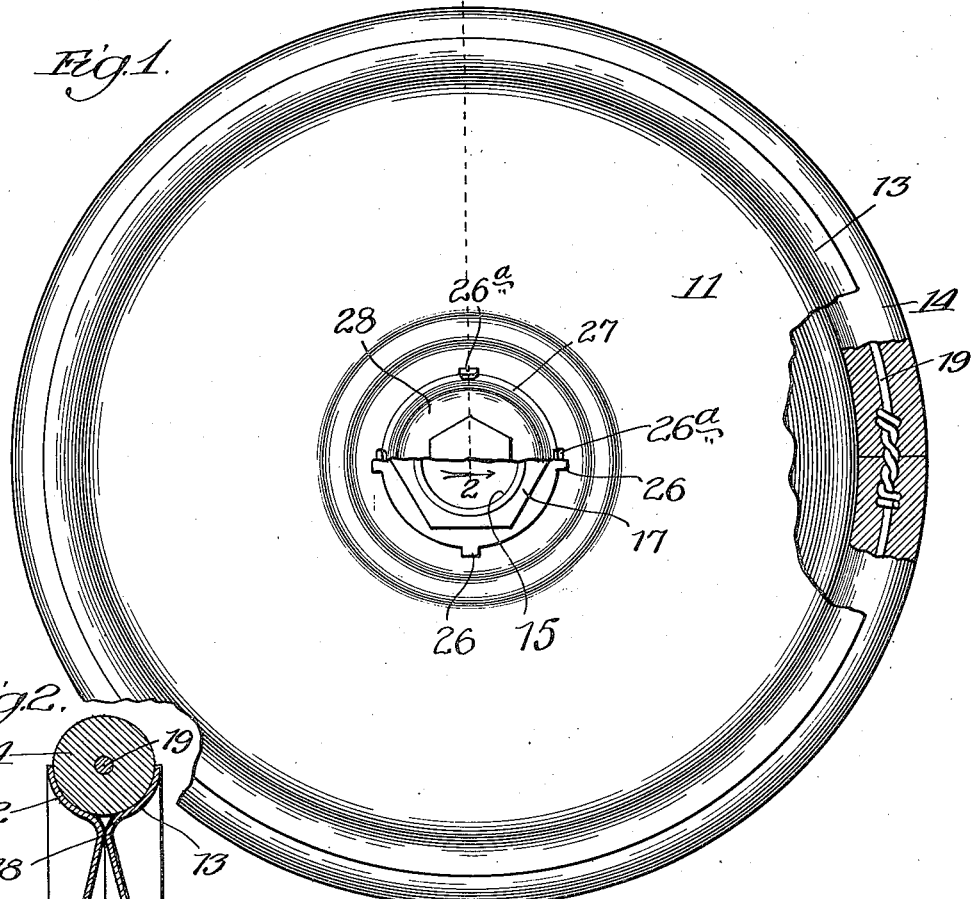
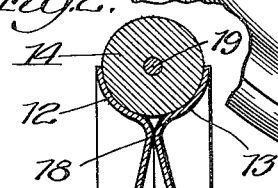
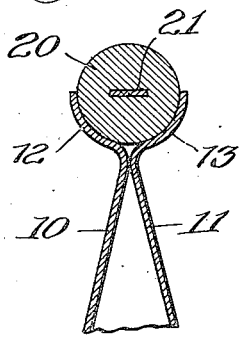
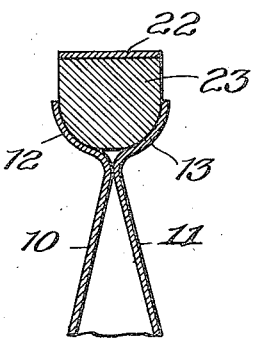
Inventor:
Howard J. Ferris June 19, 1923.
H. J. FERRIS
WHEEL FOR COASTER WAGONS
Filed Oct. 16, 1922
1,459,527
2 Sheets-Sheet 2
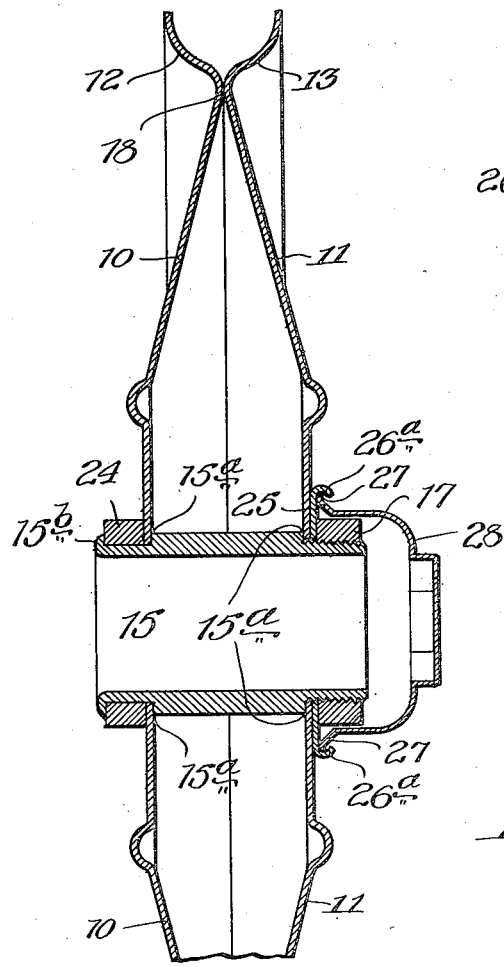
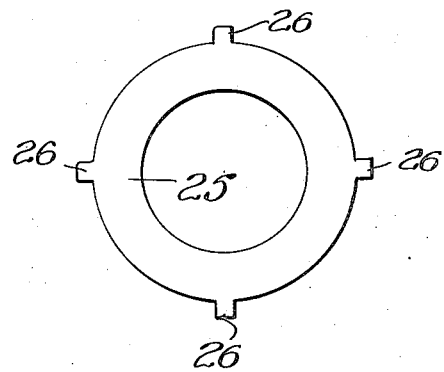
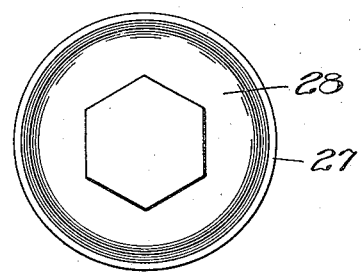
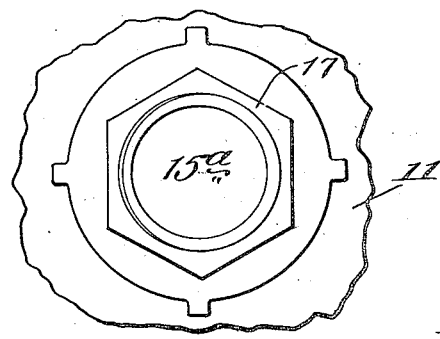
Inventor:
Howard J. Ferris,
By Dyrenforth, Lee, Chritton & Wiles,
Attys Patented June 19, 1923.

1,459,527

UNITED STATES PATENT OFFICE.

HOWARD J. FERRIS, OF HARVARD, ILLINOIS.

WHEEL FOR COASTER WAGONS.

Application filed October 16, 1922. Serial No. 594,998.

*To all whom it may concern:*

Be it known that I, HOWARD J. FERRIS, a citizen of the United States, residing at Harvard, in the county of McHenry and State of Illinois, have invented a new and useful Improvement in Wheels for Coaster Wagons, of which the following is a specification.

This invention relates to wheels, particularly disk wheels for use on coasting wagons and the like. Disk wheels for this purpose are very popular at the present time, but such wheels having grooved rims are unsatisfactory because no means has been heretofore found for satisfactorily mounting a tire on the rim.

The object of this invention is to overcome this defect by making a wheel in which the felloe or tire which is of sound deadening material, may be readily assembled on the wheel or disassembled therefrom.

The invention is fully described in the following specification and shown in the accompanying drawings, in which Figure 1 is a front elevation of a wheel embodying my invention;

Figure 2 is a perspective section on the line 2 of Fig. 1;

Figure 3 and Figure 4 are similar sections showing modified forms of the tire;

Figure 5 is a section similar to Fig. 2 showing a modified form of hub;

Figure 6 is a front elevation of a washer;

Figure 7 is a front elevation of a hub cap; and

Figure 8 is a front elevation of the hub with a nut assembled thereon.

The embodiment, as illustrated in Figs. 1 and 2, comprises two similar sheet metal disks 10 and 11 having outwardly turned rims 12 and 13 which are adapted to retain a circular tire 14 when assembled upon the tubular hub 15. This hub has two shoulders 15ª spaced such a distance apart that when the plates 10 and 11 are forced down against them by the nuts 16 and 17 which are screwed upon the threaded ends of the hub 15, the outer annular portions 18 will be forced together and the flanged rims 12 and 13 will hold the tire 14 on the wheel.

This tire may consist of rubber tubing 14, which has a small central hole through which is passed a metal wire 19. This tubing and wire are cut to the desired length, the ends of the tubing being forced back upon the wire, the free ends of which are then twisted together, as shown in Fig 1, and the tubing brought together over the joint which is thus formed. This is a well known form of tire which is commonly used on wheels for baby carriages, velocipedes and the like.

Another form of tire is shown in Fig. 3, which consists of a rubber composition or the like 20, which is molded about an annular band 21. In both of these cases, the metal core serves to stiffen the tire and to hold it upon the rim.

In Fig. 4 is shown still another modification in which a metal tire or tread 22 is shrunk upon a wooden felloe 23 which may be rounded upon its inner surface so as to be interchangeable with the tires 14 and 20, previously described.

It will be understood that in each of the tires described, the noise commonly caused by a sheet metal disk wheel, which comes directly in contact with the pavement, is very materially lessened by the use of the rubber tires as shown in Figs. 2 and 3 and of the wooden felloe 23, as shown in Fig. 4, which serves to separate the disks 10 and 11 from the steel tire or tread 22.

In Fig. 5 is shown a modified form of hub 15ª, one end of which is riveted outwardly at 15ᵇ over the washer 24. The hub 15ª is thus fixedly assembled upon the disk 10. The opposite disk 11 is then retained as before by means of the nut 17.

Both these hubs are adapted to be used with a roller bearing of the type shown in my pending application, Serial No. 461,639, filed April 15, 1921.

A washer 25 is provided behind the outer nut 17 and has ears 26 which may be bent back as shown at 26ª in Fig. 5 to retain the outer flange 27 of the hub cap 28.

While I have shown and described but a few embodiments of my invention, it is to be understood that it is capable of many modifications. Changes, therefore, in the construction and arrangement may be made which do not depart from the spirit and scope of my invention as disclosed in the appended claims and which it is my intention to cover all novelty adherent to the invention, as broadly as possible in view of the prior art.

I claim:

1. A wheel for coaster wagons comprising, in combination, a hub having spaced shoulders, disks each centrally seated on said hub, oppositely disposed peripheral flanges on said disks adapted to serve as a seat for the tire, said disks contacting at points adjacent said peripheral flanges, means carried by said hub to force the central portions of said disks against said shoulders and to secure them and thereby to exert pressure at the meeting points of said disks.

2. In a wheel for coaster wagons, a hub, a pair of oppositely dished disks mounted on said hub and meeting near their periphery, said disks being provided with oppositely directed flanges outside of said meeting point, said flanges being adapted to serve as a tire seat, and means for forcing the central dished portions of said disks toward each other whereby the disks are forced together at their meeting points.

HOWARD J. FERRIS.